L. A. PLATT.
VALVE.
APPLICATION FILED APR. 1, 1913.
1,143,225. Patented June 15, 1915.
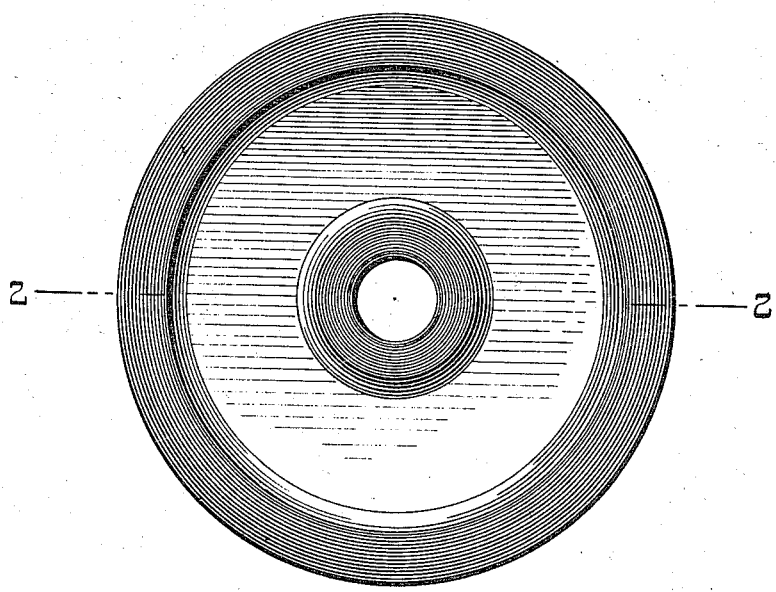
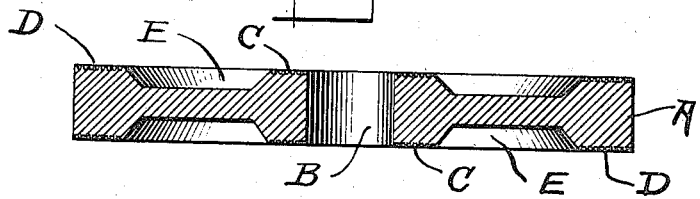

UNITED STATES PATENT OFFICE.

LEWIS A. PLATT, OF WATERBURY, CONNECTICUT.

VALVE.

1,143,225.  Specification of Letters Patent.  Patented June 15, 1915.

Application filed April 1, 1913. Serial No. 758,152.

*To all whom it may concern:*

Be it known that I, LEWIS A. PLATT, a citizen of the United States, and a resident of Waterbury, in the county of New Haven and State of Connecticut, have made and invented certain new and useful Improvements in Valves, of which the following is a specification.

My invention relates to an improvement in valves, and more particularly to disk valves such as are generally used in connection with pumps and similar machinery. As is well known, it is highly important that valves used for such purpose be made of a metal, or material somewhat softer than the valve seat, in order that the former should take whatever wear occurs, it being far more economical, both in matter of time and cost, to renew the valve than to repair or renew the seat. These seats are made of different metals or materials, as, for instance, steel, iron, bronze, or brass, according to the requirements or the conditions under which they are to be used. In order, therefore, to maintain the proper difference in hardness between the seats and the disks, many alloys and compositions have been used for the latter, for instance, brass, steel, cast iron, etc., but principally of a composition containing a large percentage of rubber. If both valve and seat are constructed of the same metal, that is, of the same hardness, both are likely to wear, resulting in leakage, and injury to the valve seat. In the use of brass for the manufacture of the valve, it has been found that the metal is too hard; that it injures the seat, and wears unevenly, and soon becomes pitted and unfit for further use. Steel valves are seldom used, by reason of the fact that the metal is too hard, resulting in injury to the seat, and furthermore, soon rust or corrode, rendering the valve useless. As before stated, the material most generally used for the construction of valves of this particular kind is a composition containing a large percentage of rubber or similar substance. The great objection urged against such valves is the comparatively short life of the same, lasting, as it does, in some instances, but a few weeks, and at most but a few months. Again, by reason of the presence of rubber in the composition, it is impossible to keep these valves in stock for any considerable length of time, as they so warp and twist as to become useless. Furthermore, these valves wear rapidly, especially when used in connection with hot water circulation, the material rapidly disintegrating, especially when employed in high pressure systems, and wherein the valve is constantly subjected to severe hammering or knocking against the valve seat, the valve in such instances often cracking or breaking.

The object of my invention is to avoid the objections heretofore urged against the valve in common use; in other words, to produce a valve which can be made sufficiently soft to receive the wear and avoid all danger of injury to the valve seat; to have sufficient tensile strength to withstand the constant hammering or vibration to which it is subjected; to be sufficiently malleable to accommodate itself to the irregularities of the valve seat, and to effect a tight joint therewith; which shall be inexpensive to manufacture, which will not readily corrode, and finally, one which will last for a much greater length of time than those now in common use.

With these and other ends in view, the invention consists, briefly speaking, of a valve adapted for use in connection with steam or hot or cold water circulating systems, and formed from rolled zinc, and preferably of a shape to be hereinafter fully described and pointed out in the claims.

In the accompanying drawings, Figure 1 is a plan view of a valve made in accordance with my invention. Fig. 2 is a view in cross-section taken on the line 2—2 of Fig. 1.

Referring to the drawings, A represents the valve preferably formed in the shape of a disk and having a central opening B through the same for the accommodation of a valve stem (not shown) and on which the valve moves vertically, as is well understood. Around this opening is formed a valve seat C, a second seat D being also formed around the outer edge, a pocket or chamber E being left between them, these raised portions C, D, contacting with the valve seat (not shown). It will be observed that the opposite faces of the disk are similarly formed or shaped, this for the purpose of permitting the valve, when worn or injured on the one side, to be reversed. These disks are made of rolled zinc, and subsequently machined to proper shape. It is essential that zinc be used which is nearly pure, analyzing approximately 99.95, as I have found that the ordinary zinc of commerce is unsuitable for the purpose, being granular in structure and therefore brittle, and also somewhat porous. It is also essential that the zinc be rolled, as I have found that valves when cast will not answer the requirements, and soon break up or disintegrate under the constant hammering or vibration to which the valve is subjected. The rolling consists in passing and repassing the metal while hot between the rolls and until the proper tensile strength and resiliency or malleability is attained, the effect of the rolling being to cause the grain or fiber of the metal to run or extend in planes parallel with the faces of the disk, and impart to the finished article qualities and characteristics not found in metal when cast into shape.

In those instances where low pressures and soft valve seats are to be used, better results are obtained by alloying the zinc before rolling with some substance, as, for example, lead, thereby resulting in a material softer than the pure zinc. If, on the contrary, the valve is to be used with high pressures and hard valve seats, it is preferable to alloy the pure zinc before rolling with a substance which will harden it, as iron, or tin. From such a mixture a valve disk can be made sufficiently hard to withstand the innumerable shocks to which it is subjected, and yet be sufficiently malleable to make a tight joint when the valve is in its closed adjustment.

From actual test, I have found that valves, when so made, last a much greater length of time than when made of other materials, as, for instance, I have found by experiment that when subjected to the action of hot water in a boiler feed pump, and wherein the ordinary valve lasted but a few weeks, my improved valve is in good condition at the end of eighteen months. Furthermore, the valve, being softer than the valve seat, in no wise injures the latter, and being malleable, partakes of the irregularities of the valve seat. In order to assist in this action, I preferably score or corrugate the two seats C, D, as illustrated at F, the metal between the corrugations being quickly and readily flattened out to assume the exact shape or surface of the seat, and to effect a tight joint therewith. Again, the valve is possessed of sufficient strength to withstand the constant hammering thereof on the valve seat, without danger of breaking or cracking, does not rust or corrode, and is comparatively inexpensive to manufacture.

What I claim is:—

1. A valve formed from rolled zinc.
2. A valve formed from rolled alloyed zinc.
3. A valve formed of zinc with the grain or fiber of the metal rolled into planes extending parallel to the wearing faces of the valve.
4. A valve including wearing faces, said valve formed of a metallic substance including zinc with the fibers or grain thereof lying in planes substantially parallel to the wearing faces of said valve.
5. A valve formed from a blank of rolled zinc, with the fibers or grain thereof extending in parallel planes, said valve being provided with wearing faces, said faces extending substantially parallel to the planes of the grain or fibers of the zinc.

Signed at Waterbury in the county of New Haven and State of Connecticut this 26th day of March A. D. 1913.

LEWIS A. PLATT.

Witnesses:
JOHN J. CROUSE,
KATHARINE A. RUBEY.